United States Patent
Wang et al.

(10) Patent No.: US 12,145,077 B2
(45) Date of Patent: Nov. 19, 2024

(54) SUCTION-TYPE TOY

(71) Applicants: SHANG HAI LE Young Electronic Commerce Co., Ltd., Shanghai (CN); JOYIN US CORP., Tempe, AZ (US)

(72) Inventors: Xinyu Wang, Tempe, AZ (US); Liuxian Zhang, Tempe, AZ (US)

(73) Assignees: SHANG HAI LE Young Electronic Commerce Co., Ltd., Shanghai (CN); JOYIN US CORP., Tempe, AZ (US)

( * ) Notice: Subject to any disclaimer, the term of this patent is extended or adjusted under 35 U.S.C. 154(b) by 183 days.

(21) Appl. No.: 17/933,538

(22) Filed: Sep. 20, 2022

(65) Prior Publication Data

US 2023/0094200 A1 Mar. 30, 2023

(30) Foreign Application Priority Data

Sep. 28, 2021 (CN) .......................... 202122357996.X

(51) Int. Cl.
*A63H 27/10* (2006.01)
*A63H 3/06* (2006.01)
*A63H 3/50* (2006.01)
*F16B 47/00* (2006.01)

(52) U.S. Cl.
CPC .................. *A63H 3/50* (2013.01); *A63H 3/06* (2013.01); *A63H 27/10* (2013.01); *F16B 47/00* (2013.01); *A63H 2027/1008* (2013.01)

(58) Field of Classification Search
CPC ............ A63H 27/10; A63H 2027/1008; G09F 2007/1852
See application file for complete search history.

(56) References Cited

U.S. PATENT DOCUMENTS

| 6,644,843 | B2 * | 11/2003 | Chin-Cheng | .......... A63H 27/10 446/226 |
| 6,786,793 | B1 * | 9/2004 | Wang | .................... A63H 27/10 446/176 |
| 9,192,870 | B2 * | 11/2015 | Chapman-Rickman | ..................... A63H 27/10 |
| 9,919,828 | B2 * | 3/2018 | Rhinerson | .............. A63H 27/10 |
| 9,925,473 | B2 * | 3/2018 | Povitz | .................... A63H 27/10 |
| 2007/0049158 | A1 * | 3/2007 | Chou | ..................... A63H 27/10 446/220 |
| 2009/0275260 | A1 * | 11/2009 | Lockett | .................. A63H 27/10 446/222 |

* cited by examiner

*Primary Examiner* — John A Ricci
(74) *Attorney, Agent, or Firm* — Hemisphere Law, PLLC; Zhigang Ma

(57) ABSTRACT

A suction-type toy includes a main body and a suction device. The suction-type toy further includes an internal connection device and an external connection device, wherein the internal connection device is fixed inside the main body, the external connection device is fixed outside the main body, and the internal connection device and the external connection device are configured to connect the suction device and the main body.

A screw suction cup enhances suction capacity, increases use times of the suction cup and reduces environmental pollution by connecting the internal connection device and the external connection device to the suction cup respectively. In addition, the suction-type toy may form a specific shape, with more dynamic and three-dimensional beauty, to achieve the purpose of using the suction-type toy to create various festive atmospheres or to meet other needs for decoration and entertainment.

13 Claims, 2 Drawing Sheets

SUCTION-TYPE TOY

CROSS REFERENCE TO RELATED APPLICATIONS

This application claims priority to Chinese Application No.: 202122357996.X filed on Sep. 28, 2021. The contents of this prior application is hereby incorporated by reference herein in its entirety.

TECHNIC FIELD

The present disclosure relates to the field of toys, in particular to a suction-type toy.

BACKGROUND

With the development of economy, people's material life is getting better and better, and there is more demand for all kinds of toys. Inflatable toys are toys or ornaments favored by many merchants or consumers. The inflatable toys are inflated to achieve an ideal shape when in use; and the internal gas may be released when not in use, so they also have the advantage of easy storage. Almost all inflatable dolls on the market are fixed on the ground. Some are pressed to the ground with heavy objects, some are hooked to the ground, and some are hung on trees. Some toys that can be attached to a wall, a door or a window are also small objects that are fixed in shape, not inflatable products.

At present, there are almost no inflatable ornaments or toys on the market that can fix the inflatable toys to upright objects such as walls and windows. However, in many scenes, in order to create a certain atmosphere or for other purposes, it may be necessary to fix the inflatable toys on a vertical plane such as the window, the door, and the wall in a relatively three-dimensional form or with a specific action. For example, in the context of Halloween, consumers may need some inflatable dolls in a ghost shape that may be fixed on the window to achieve the effect of the ghosts breaking into the window, so as to create a Halloween atmosphere.

To fix the inflatable doll on the vertical plane such as the window, the door, the wall, etc., optionally, one way is to fix a main body of the toy on the above-mentioned vertical plane through a suction cup, but an ordinary suction cup is generally connected to the object to be suspended through a lanyard. Although the object can be suspended, a certain part of the object cannot be fixed to form a specific action. A screw suction cup is a relatively new type of suction cup. Compared with the ordinary suction cup, the screw suction cup can not only be more tightly connected to the product without falling off, but also has a wide range of uses. As long as having a nut with corresponding specification, a product can be connected to the screw suction cup, which greatly improves range and probability of use. In addition, there is only a short distance between the nut of the screw suction cup and the suction cup, which can directly fix a certain part of the item on the vertical surface. However, the scope of use of the screw suction cup is not as wide as that of the ordinary suction cup. Especially in the field of toys, most of the toys use the ordinary suction cup, and there are few precedents for applying the screw suction cup to the inflatable dolls. Therefore, there is a need to provide a suction-type toy that utilizes the screw suction cup for suction.

SUMMARY

In order to solve at least one of the above problems, the present utility model provides a suction-type toy which has advantages of an ingenious design, a strong suction capacity, and being able to make the suction-type toy closely adhere to a vertical plane such as a glass, a door, and a wall.

The above-mentioned suction-type toy is composed of a main body and a suction device, wherein the suction device is a recyclable suction device, and the suction-type toy further includes:

an internal connection device, fixed inside the main body;

an external connection device, fixed outside the main body;

wherein the internal connection device and the external connection device are configured to connect the suction device and the main body.

In the above-mentioned devices, the suction device further includes a suction cup set for fixing the main body.

In the above-mentioned devices, the internal connection device is disposed at a lower part of the main body, and the external connection device is disposed at an upper part of the main body.

In the above-mentioned devices, the suction cup set further includes:

a first suction cup set, disposed at the upper part of the main body; and a second suction cup set, disposed at the lower part of the main body.

In the above-mentioned devices, the first suction cup set is connected to the external connection device and the second suction cup set is connected to the internal connection device.

In the above-mentioned devices, the internal connection device is a nut device and the external connection device is a lanyard.

In the above-mentioned devices, the second suction cup set has more suction cups than the first suction cup set, and the second suction cup set includes at least two suction cups.

In the above-mentioned devices, the second suction cup set includes four suction cups.

In the above-mentioned devices, the suction-type toy is an inflatable toy, and the four suction cups of the second suction cup set are arranged in a rectangular shape.

In the above-mentioned devices, the suction-type toy is in a ghost shape.

The advantages and beneficial effects of the present invention are as follows.

The present invention provides an suction-type toy which adopts the internal connection device and the external connection device to connect with the suction cup, achieving effects of skillfully using the screw suction cup to enhance the suction capacity, increase use times of the suction cup and reduce environmental pollution. According to the different designs of the final shape, the suction-type toys can be used to create various festival atmospheres or meet the needs of other decoration and entertainment. The suction-type inflatable toy designed through the solution described in the present utility model has higher dynamic and three-dimensional aesthetics.

BRIEF DESCRIPTION OF THE DRAWINGS

In order to illustrate the embodiments of the present invention or the technical solutions in the prior art more clearly, the accompanying drawings that are used in the description of the embodiments or the prior art will be briefly introduced below. Obviously, the drawings in the following description are only some embodiments of the present utility model. For those of ordinary skill in the art, other drawings may also be obtained from these drawings without inventive effort.

DESCRIPTION OF REFERENCE NUMBERS

1—Suction-type toy; 2—Main body; 3—External connection device; 4—Internal connection device; 5—First suction cup set; 6—Second suction cup set.

DETAILED DESCRIPTION OF THE EMBODIMENTS

The specific implementation manners of the present utility model will be further described below with reference to the accompanying drawings and embodiments. The following embodiments are only used to illustrate the technical solutions of the present invention more clearly, and cannot be used to limit the protection scope of the invention.

Figure 1:
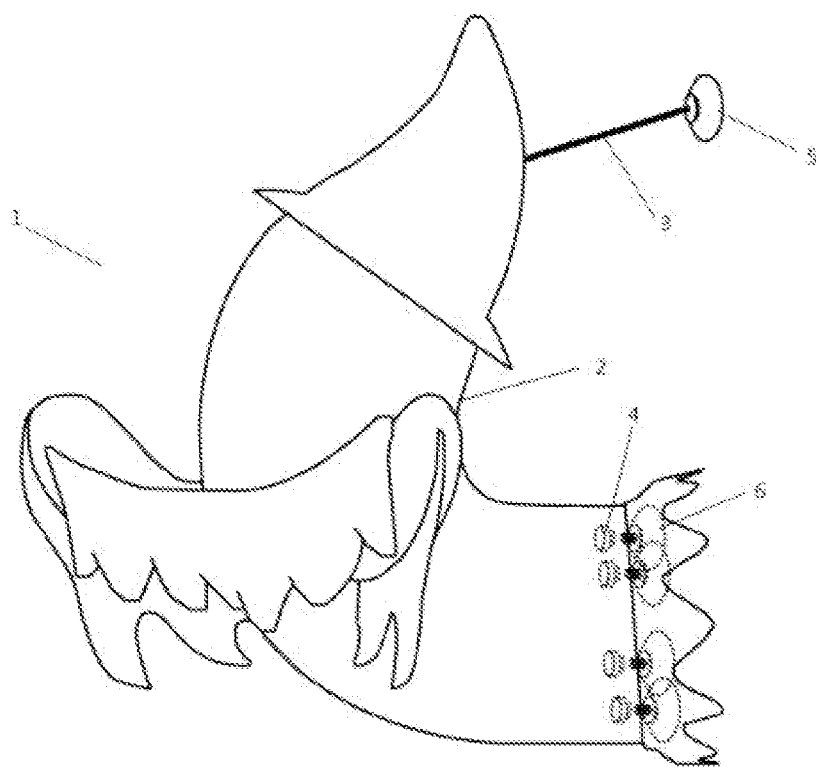
FIG. 1 is a schematic diagram of a front view of a suction-type toy according to an embodiment of the present utility model.

As shown in FIG. 1, a suction-type toy 1 which includes a main body 2 and a suction device is shown. In addition, the suction-type toy 1 further includes an internal connection device 4 and an external connection device 3, where the internal connection device 4 is fixed inside the main body 2, the external connection device 3 is fixed outside the main body 2, and the internal connection device 4 and the external connection device 3 is configured to connect the suction device and the main body 2.

Through the arrangement of the above structure, connection devices are respectively provided inside and outside the main body 2, so that the main body 2 can not only be suspended on a vertical plane such as a glass, a door, a wall, etc., but also can be connected to the suction device with the internal connection device and the external connection device respectively, so as to achieve a purpose of making the suction-type toy 1 adhere to the above-mentioned vertical plane in a specific shape.

Preferably, the suction device further includes a suction cup set for fixing the main body 2. The principle of the suction cup is to use the atmospheric pressure to press out the air in the suction cup, then a pressure difference may be generated between the inside of the suction cup and the outside world, so the suction cup may be pressed by the outside air on the smooth surface. Once a little air enters the suction cup, an internal pressure and an external pressure are balanced, the atmosphere may lose pressure on the suction cup, and the suction cup may fail and fall. The suction cup may be adhered on most of smooth surfaces, without the need to be pasted with glue or other substances, but only relying on atmospheric pressure. Therefore, the suction cup may be used repeatedly under the premise of ensuring suction effect, and may not leave stains on a suction position, which is conducive to reducing environmental pollution and improving use effect of users.

As a preferred embodiment, the internal connection device 4 is disposed at a lower part of the main body 2, and the external connection device 3 is disposed at an upper part of the main body 2. Depending on the usage scenario and purpose, positions of the connection devices may be set up differently.

Preferably, the suction cup set includes a first suction cup set 5 and a second suction cup set 6. In order to match the positions of the internal connection device and the external connection device, so that the main body 2 may form a desired action, the first suction cup set 5 is disposed at the upper part of the main body 2, the second suction cup set 6 is disposed at the lower part of the main body 2.

Preferably, the first suction cup set 5 is connected to the external connection device 3, and the second suction cup set 6 is connected to the internal connection device 4.

Preferably, the internal connection device 4 is a nut device, and the external connection device 3 is a lanyard. The internal connection device 4 and the second suction cup set 6 form a screw suction cup, which has a better suction effect. The screw suction cup is a relatively new type of suction cup. Compared with an ordinary suction cup, the screw suction cup can not only be more tightly connected to the product without falling off, but also has a wide range of uses. As long as having a nut with corresponding specification, a product can be connected to the screw suction cup, which greatly improves range and probability of use.

Figure 2:
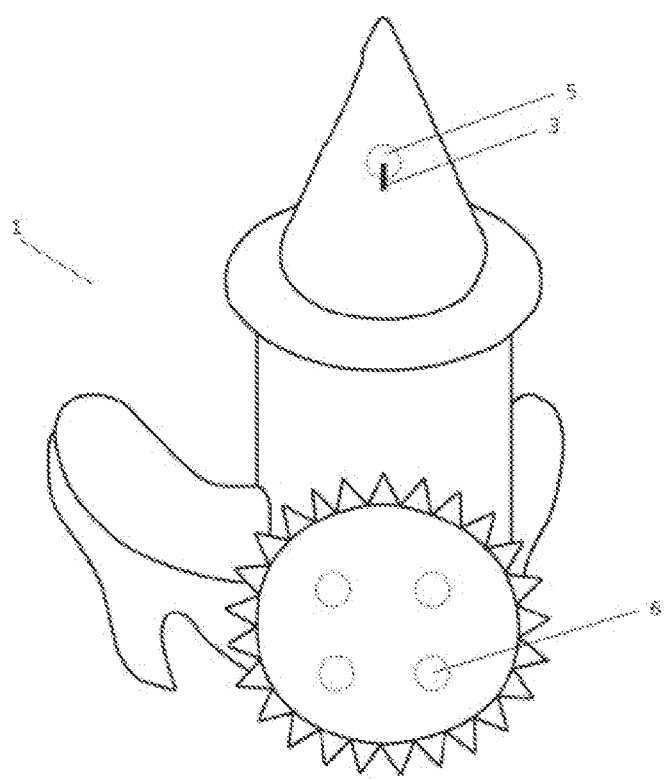
FIG. 2 is a schematic diagram of a right view of a suction-type toy according to an embodiment of the present utility model.

Preferably, the second suction cup set 6 has more suction cups than the first suction cup set 5, and the second suction cup set 6 includes at least two suction cups. As shown in FIG. 2, in a preferred embodiment, in order to enhance a suction force of the suction-type toy, the second suction cup set 6 includes four suction cups. Preferably, the four suction cups of the second suction cup set 6 are arranged in a rectangular shape.

In one embodiment, the suction-type toy 1 is in a ghost shape. Taking the ghost shape as an example, a specific implementation manner will be introduced below for the reference of operators.

Herein, in this embodiment, the suction toy 1 includes at least a main body 2, a suction device, an internal connection device 4 and an external connection device 3. The suction device includes a first suction cup set 5 and a second suction cup set 6. The first suction cup set 5 and the second suction cup set 6 are respectively disposed at an upper part and a lower part of the main body 2, and the first suction cup set 5 is composed of one suction cup, and the second suction cup set 6 is composed of four suction cups arranged in a rectangular shape. The internal connection device 4 is a nut device fixed inside the main body 2; the external connection device 3 is a lanyard fixed outside the main body 2. The external connection device 3 and the internal connection device 4 are respectively connected with the first suction cup set 5 and the second suction cup set 6.

A position where the first suction cup set 5 of the suction-type toy 1 will be fixed is determined according to a position to be installed, and the suction cup set is pressed to a designated position. Then a position where the second suction cup set 6 will be fixed is adjusted according to the position of the suction-type toy 1 at this time. The lower part of the suction-type toy 1 is also fixed on a window through the screw suction cup, so as to achieve the effect of the suction-type toy 1 with the ghost shape sticking to the window with a specific action, as if going to break into the window.

A shape of the main body of the suction toy 1 is not limited, and may be replaced with other shape designs as required. For example, the suction-type toy may be designed in a shape of Santa Claus at Christmas. A suction surface of the suction-type toy is not limited to a glass, a door, a wall, and any smooth surface that may be adhered by the suction cup may become a fixed surface of the suction-type toy. When the shape of the main body 1 is the Santa Claus, this product has a three-dimensional and dynamic beauty that Santa Claus emerges from the wall, door or window. Similarly, the main body 2 may also have various shapes to adapt to different application scenarios and users.

The above description of the disclosed embodiments is provided to enable those skilled in the art to implement or use the present utility model. Various modifications to these embodiments will be readily apparent to those skilled in the art, and the general principles defined herein may be implemented in other embodiments without departing from the spirit or scope of the present utility model. Therefore, the present utility model is not to be limited to the embodiments shown herein, but is to be accorded with the widest scope consistent with the principles and novel features disclosed herein. Any modification, equivalent replacement, improvement, etc. made within the spirit and principles of the present utility model should be included within the protection scope of the present utility model.

What is claimed is:

1. An inflatable toy, composed of a main body and a suction device, wherein the suction device is a recyclable suction device, and the inflatable toy further comprises:
    an internal connection device, fixed inside the main body;
    an external connection device, fixed outside the main body;
    wherein, the internal connection device and the external connection device are configured to connect the suction device and the main body;
    wherein the internal connection device is disposed at a lower part of the main body, and the external connection device is disposed at an upper part of the main body.

2. The inflatable toy according to claim 1, wherein the suction device further comprises a suction cup set for fixing the main body.

3. The inflatable toy of claim 2, wherein the suction cup set further comprises:
    a first suction cup set, disposed at an upper part of the main body; and
    a second suction cup set, disposed at a lower part of the main body.

4. The inflatable toy according to claim 3, wherein the first suction cup set is connected to the external connection device, and the second suction cup set is connected to the internal connection device.

5. The inflatable toy according to claim 4, wherein the second suction cup set has more suction cups than the first suction cup set, and the second suction cup set comprises at least two suction cups.

6. The inflatable toy according to claim 5, wherein the second suction cup set comprises four suction cups.

7. The inflatable toy according to claim 6, wherein the four suction cups of the second suction cup set are arranged in a rectangular shape.

8. The inflatable toy according to claim 4, wherein the inflatable toy is in a ghost shape.

9. The inflatable toy according to claim 2, wherein the inflatable toy is in a ghost shape.

10. The inflatable toy according to claim 1, wherein the internal connection device is a nut device and the external connection device is a lanyard.

11. The inflatable toy according to claim 10, wherein the inflatable toy is in a ghost shape.

12. The inflatable toy according to claim 1, wherein the inflatable toy is in a ghost shape.

13. The inflatable toy according to claim 1, wherein the inflatable toy is in a ghost shape.

* * * * *